July 2, 1929.　　　　F. PERURENA　　　　1,719,780
HEATING UNIT
Filed June 30, 1925　　　2 Sheets-Sheet 1
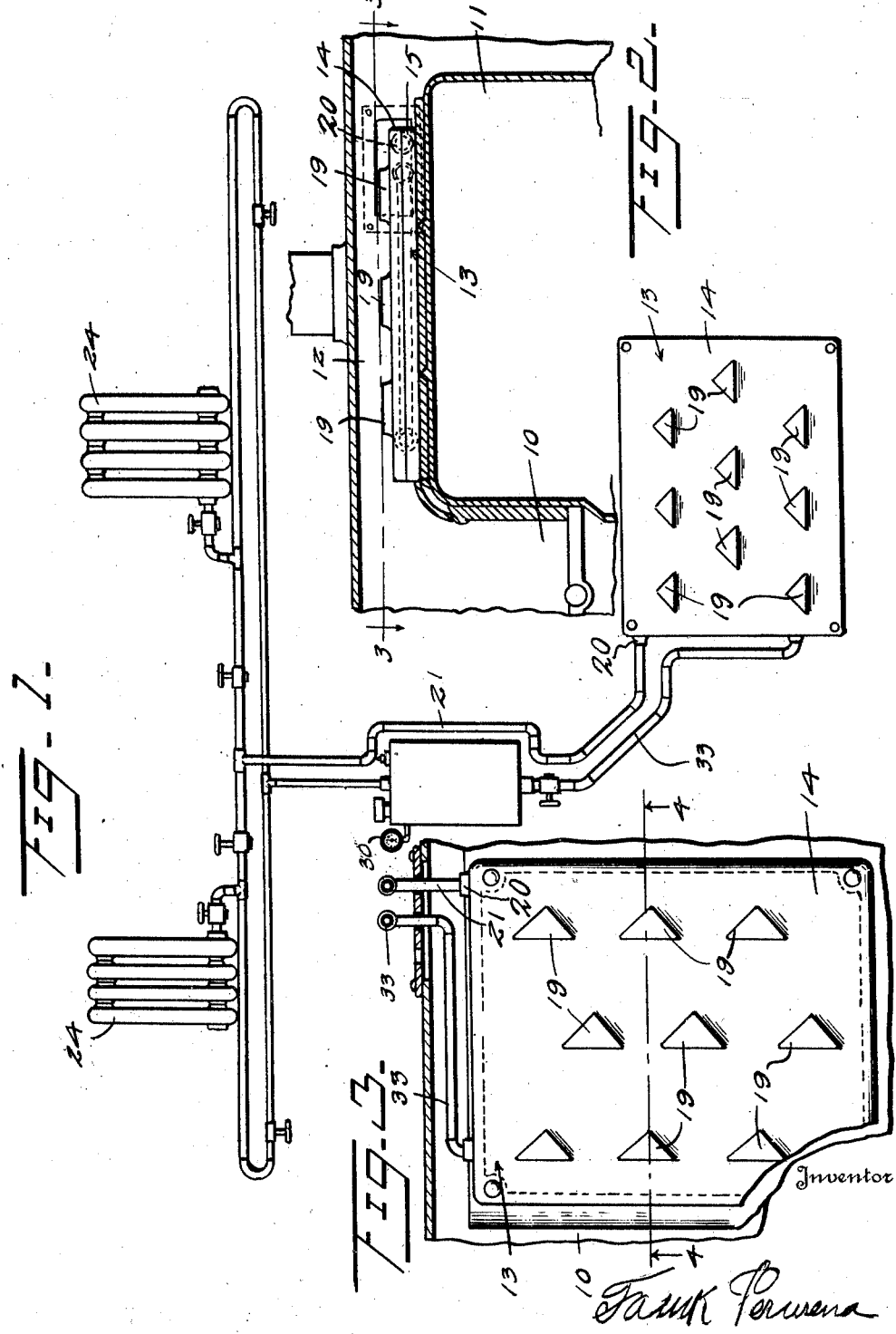

July 2, 1929.  F. PERURENA  1,719,780
HEATING UNIT
Filed June 30, 1925   2 Sheets-Sheet 2
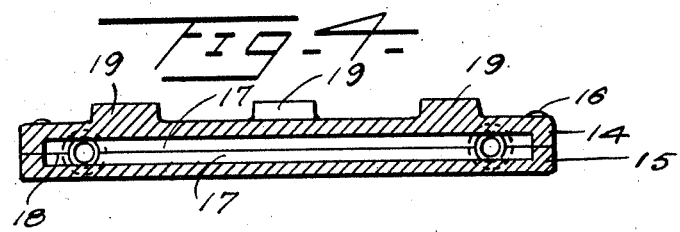
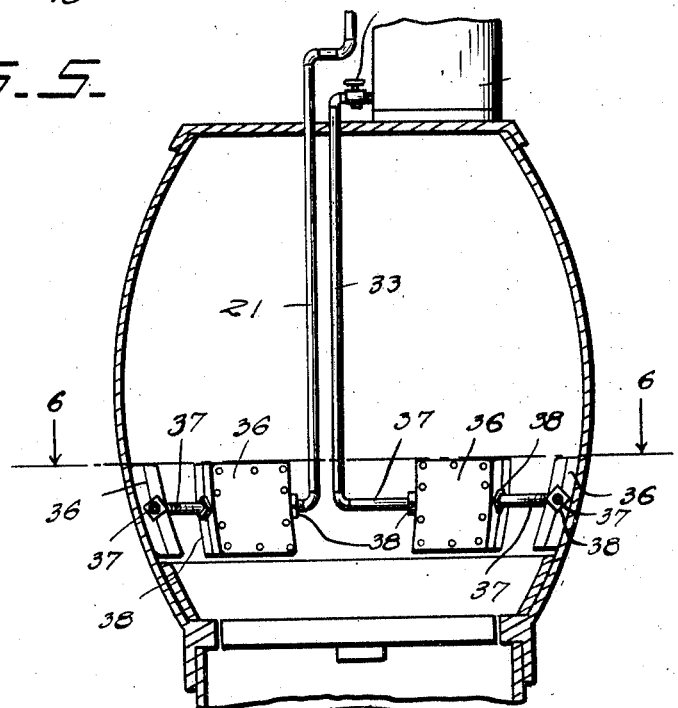
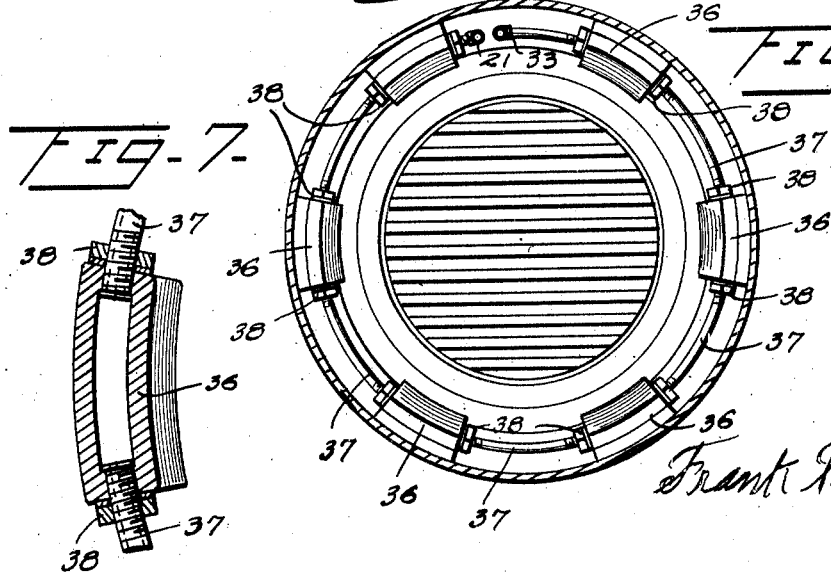
Inventor
Frank Perurena Patented July 2, 1929.

1,719,780

UNITED STATES PATENT OFFICE.

FRANK PERURENA, OF PALISADE, NEVADA; MARIENE PERURENA ADMINISTRATRIX OF SAID FRANK PERURENA, DECEASED.

HEATING UNIT.

Application filed June 30, 1925. Serial No. 40,526.

The present invention relates to heating units adaptable to heating and cooking stoves now in use, and aims to provide a novel and improved attachment of this character which may be conveniently attached to a stove for efficiently supplying heat to the various rooms of a building.

Another object of the invention is the provision of heating units which are adapted to be positioned in the fire box of a stove for converting water in said heating units into steam, said heating units having communicating therewith a steam outlet pipe leading to radiators arranged in various parts of a building and a water inlet pipe.

A further object of the invention is to provide heating units constructed of separable sections which are adapted to be attached together for forming water and steam passageways therebetween, which permits said sections to be separated for cleaning, and the like.

It is also an object of the invention to provide a heating system of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein:

Figure 1 is a diagrammatic view showing my improved attachment removed from a stove, Figure 2 is a vertical section through a stove showing a heating unit arranged therein, Figure 3 is a horizontal section taken on line 3—3 of Figure 2, Figure 4 is a cross section through a heating unit taken on line 4—4 of Figure 3, Figure 5 is a vertical section through a heating stove showing a series of heating units arranged therein, Figure 6 is a horizontal section taken on line 6—6 of Figure 5, and Figure 7 is a horizontal section through one of the heating units illustrated in Figures 5 and 6.

Referring to the form of my invention illustrated in Figures 1, 2, 3, and 4 for use in connection with cook stoves having a fire box 10, oven 11, and smoke passageway 12 arranged above said oven, the numeral 13 designates a heating unit composed of two sections 14 and 15 which are secured together by rivets, or the like, 16. On the inner face of each of the sections an enlarged recess 17 is provided, said recesses when arranged together providing an enlarged hollow portion 18 in the heating unit. Upon the exterior surface of the uppermost section 14 of the heating unit is provided a series of upstanding lugs 19 which extend into the smoke passageway 12 so as to absorb heat passing therethrough. The lugs may also be used if so desired for spacing the heating units from a wall of the stove in order that heat may pass on all sides of the heating units.

In order that my invention may be thoroughly understood, I have shown attached to the heating unit and communicating therewith, as at 20, a steam outlet pipe 21, which extends upwardly and is connected with radiators 24 and a return pipe 33 which in turn is connected to the heating unit 13 for supplying water thereto.

From the foregoing it can be seen that the heat in the stove will vaporize the water contained in the heating unit to steam which may pass upwardly to the radiators 24 arranged throughout a building, and that when the steam condenses to a liquid form the same returns again to the heating unit through the pipe 33.

Referring to the form of my invention illustrated in Figures 5, 6, and 7, it will be noted that I have provided a series of heating units 36 which are adapted to be used in connection with a heating stove and arranged for engaging the side walls of said stove at the fire box thereof. Each of the heating units 36 is constructed in a manner similar to that shown in the other form of my invention, that is, each unit is constructed of a pair of sections secured together in order to form a hollow chamber in each unit. The units are connected together by a series of pipe connections 37 which are screw-threaded at their opposite ends for threadedly engaging into the respective units and have provided thereon nuts 38 for preventing relative turning movement of the units with respect to the pipe connections. It will be noted that the series of heating units 36 may rest upon the grate flange or the grate in order to support said heating elements against relative downward movement.

In operation of my improved device the fire in the fire box of the stove will heat the heating units, thus causing the vaporization of the water contained therein to steam, which passes upwardly through the pipe 21 to the radiators throughout the building. As the steam condenses, the same is again permitted to enter the heating units through the pipe 33.

Having thus described my invention, what I claim as new is:

1. A water back comprising plates provided at their edges and at one side with continuous flanges, means for securing the edges of the flanges together and inlet and outlet pipe sections screwed into the edges of the opposite flanges and communicating with the interior of the water back.

2. A water back comprising plates provided at their edges and at one side with continuous flanges, means for securing the edges of the flanges together, pipe sections having screw thread engagement with the edges of the opposite flanges and communicating with the interior of the water back, one of the plates only being provided at its exterior surface with a series of outstanding lugs.

In testimony whereof, I have affixed my signature.

FRANK PERURENA.